No. 748,473. PATENTED DEC. 29, 1903.
C. A. G. BREMER.
HOOK PROVIDED WITH COUNTING MECHANISM.
APPLICATION FILED OCT. 16, 1901.
NO MODEL.
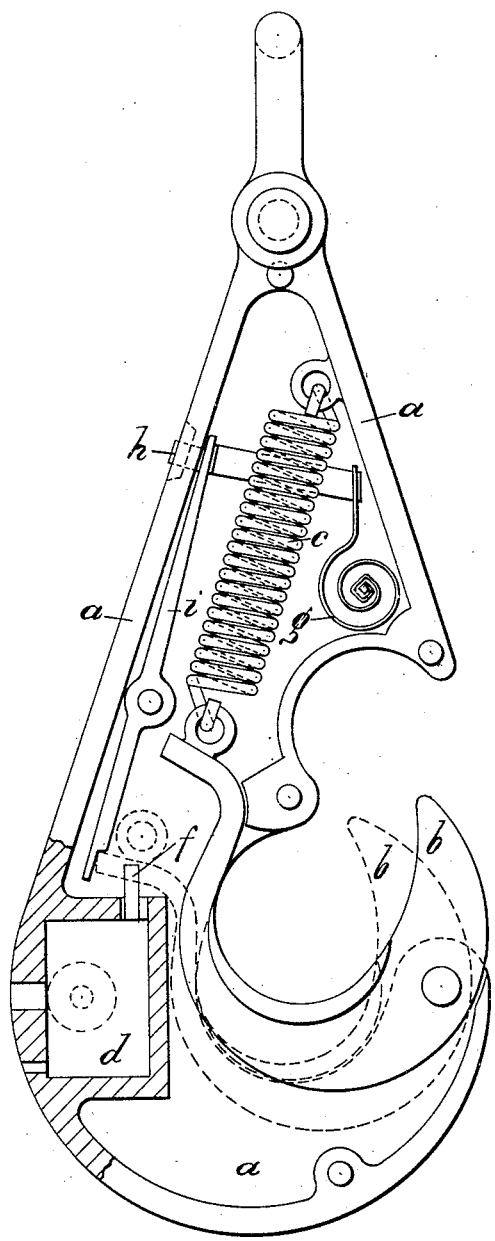
Witnesses:
William Schulz
Edward Ray
Inventor:
Carl Andreas Georg Bremer
per Roeder & Briesen Attorneys No. 748,473. Patented December 29, 1903.

UNITED STATES PATENT OFFICE.

CARL ANDREAS GEORG BREMER, OF HAMBURG, GERMANY, ASSIGNOR TO GUSTAV ERWIN STOOP, OF HAMBURG, GERMANY.

HOOK PROVIDED WITH COUNTING MECHANISM.

SPECIFICATION forming part of Letters Patent No. 748,473, dated December 29, 1903.

Application filed October 16, 1901. Serial No. 78,764. (No model.)

*To all whom it may concern:*

Be it known that I, CARL ANDREAS GEORG BREMER, a subject of the Grand Duke of Mecklenburg-Swerin, residing at Hamburg, Germany, have invented certain new and useful Improvements in Hooks Provided with Counting Mechanism, of which the following is a specification.

This invention relates to a hook of novel construction and adapted to automatically operate a counting mechanism.

The drawing represents a sectional elevation of my improved hook with the front of the casing removed.

The letter $a$ represents a hook-shaped casing, to the front end of which a hook $b$ is pivoted. To the rear end of the hook $b$ is attached a spring $c$, which when the hook is unloaded draws the hook $b$ partially into the concavity of the casing in such a manner that the point of suspension of the load lies vertically under the point of suspension of the hook in the shackle, but when the hook is loaded yields so that the hook $b$ can be forced down by the load to the bottom of the concavity of the casing $a$, the point of the hook $b$ simultaneously closing the entrance of the concavity. When the hook $b$ is thus drawn down by the load, the weight of the latter will be transferred to the concave bottom of the casing, so that the hook is correspondingly relieved. Attached also to the casing $a$ is the counting mechanism $d$, which may, if desired, be provided with a printing device, and a pin $f$ projects therefrom into the path of the rear end of the hook $b$. When the hook $b$ is forced down, a notched lever $i$, provided with a pressure-stud $h$ and actuated by a spring $g$, moves in front of its rear end, so as to prevent the hook from opening accidentally.

I claim—

A safety-hook composed of a hook-shaped casing, a hook pivoted to the front of said casing, a spring adapted to draw the hook into the concavity of the casing, and a counting mechanism actuated by the hook, substantially as specified.

Signed at Hamburg, in Germany, this 5th day of October, A. D. 1901.

CARL ANDREAS GEORG BREMER.

Witnesses:
MAX FOUGUCT,
FRANZ STEFFENS.